C. B. JACOBY.
COOKING UTENSIL.
APPLICATION FILED MAY 15, 1908.
905,879.
Patented Dec. 8, 1908.
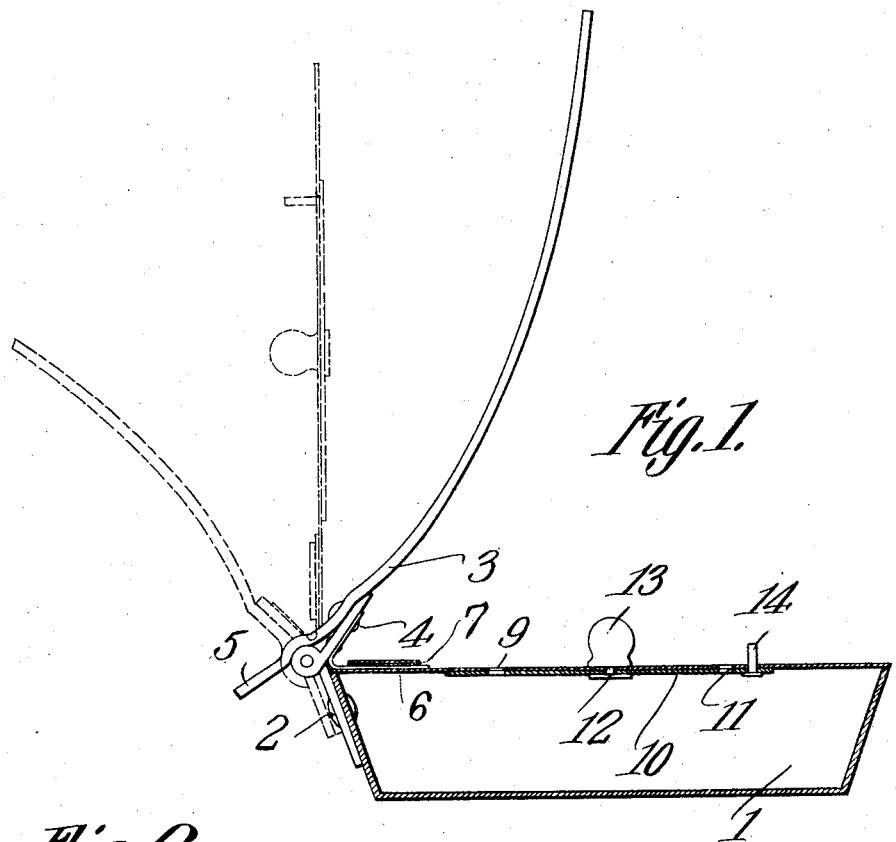
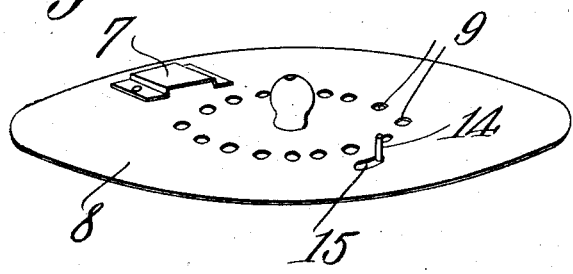
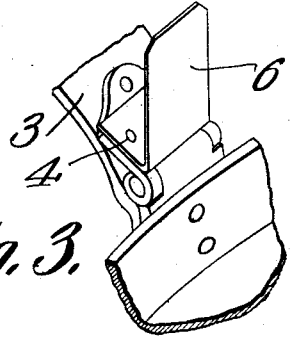
Witnesses
Inventor
Charles B. Jacoby.
By C. A. Snow & Co
Attorneys

UNITED STATES PATENT OFFICE.

CHARLES B. JACOBY, OF WEST NANTICOKE, PENNSYLVANIA.

COOKING UTENSIL.

No. 905,879.  Specification of Letters Patent.  Patented Dec. 8, 1908.

Application filed May 15, 1908. Serial No. 433,068.

*To all whom it may concern:*

Be it known that I, CHARLES B. JACOBY, a citizen of the United States, residing at West Nanticoke, in the county of Luzerne and State of Pennsylvania, have invented a new and useful Cooking Utensil, of which the following is a specification.

This invention relates to cooking utensils.

The object of the invention is to provide a cooking utensil, in this instance a frying pan, having a cover hingedly connected with its handle but capable of being detached therefrom, whereby to permit cooking either in an open utensil or a closed one, according as the requirements of the case may demand. Furthermore, to provide a utensil having a hinged handle carrying the cover, the handle being so connected with the utensil that when the cover is positioned on the utensil the handle will occupy a position thereover, thus to cause the handle to remain cool and thereby prevent burning of the hands of the attendant. Furthermore to provide a utensil having a hinged but detachable cover provided with ventilating means whereby to permit the escape of odors, and also to prevent burning of the contents of the utensil.

With the above and other objects in view, as will appear as the nature of the invention is better understood, the same consists in the novel construction and combination of parts of a cooking utensil, as will be hereinafter fully described and claimed.

In the accompanying drawings forming a part of this specification and in which like characters of reference indicate corresponding parts—Figure 1 is a view in vertical longitudinal section through a frying pan embodying the features of this invention, the closed position of the cover being indicated by full lines and its open position by dotted lines. Fig. 2 is a perspective detail view of the cover. Fig. 3 is a fragmentary view in perspective showing the manner of connecting the handle with the frying pan and also the means for permitting detachable connection of the cover with the handle.

Referring to the drawings, 1 designates an ordinary frying pan or skillet, which may be of cast iron, cast steel or stamped sheet metal. Arranged at one point on the exterior of the wall of the pan is a hinge, one leaf of which is riveted at 2 to the wall, and the other leaf of which is riveted to the handle 3 by a rivet or rivets 4. The handle has an extension 5 that is designed to form a stop to limit its opening movement, as shown by dotted lines in Fig. 1. The rivet or rivets 4 also serve to hold assembled with one leaf of the hinge a clip 6 that is designed to engage with a keeper 7 riveted to the cover 8. The cover is herein shown as a flat disk-like structure, although it may be of other configurations, and is provided with a series of ventilating openings 9 that are disposed in this instance in a circle, and on the under side of the cover is arranged a damper or disk 10 that lies close to the cover and has openings 11 to register with those of the cover. The damper is held against the cover by a headed rivet or screw 12 which projects upward beyond the outer face of the cover and carries a knob 13 by which the cover may be manipulated when it is to be detached from the clip. In order to rotate the damper thus to open or close the openings 9, a stud 14 is secured to the damper and projects through a curved slot 15 formed in the cover.

It will be seen from the foregoing description that owing to the manner in which the handle is assembled with the pan it may be turned over the same and thus be shielded against becoming heated to such an extent as to burn the hands of an attendant. Furthermore, by the provision of the clip and keeper, the cover may be detachably and yet securely combined with the handle so that when the latter is thrown back to the position shown by dotted lines in Fig. 1 the cover will also be raised to permit access to the pan.

While the improvements have been shown and described as applied to a frying pan, it is to be understood that they are equally adaptable for use in connection with all kinds of culinary utensils, and as this will be obvious, detailed illustration of other applications is omitted.

The improvements are simple in character but will be found thoroughly efficient for the purposes designed.

What is claimed is:—

The combination with a cooking utensil, of a hinge having one leaf secured thereto, a handle secured to the other leaf and provided with a terminal stop to limit movement of the handle in one direction, a clip secured to the last-named leaf, and a cover having a keeper to engage the clip.

In testimony that I claim the foregoing as my own, I have hereto affixed my signature in the presence of two witnesses.

CHARLES B. JACOBY.

Witnesses:
H. K. RUNYAN,
J. K. VAN HORN.